C. A. EGENER.
MUSIC NOTATION FOR THE BLIND.
APPLICATION FILED JUNE 16, 1919.

1,320,746.

Patented Nov. 4, 1919.

Inventor:
C. A. Egener,
By his Attorney
Wm. H. Reich.

UNITED STATES PATENT OFFICE.

CARL A. EGENER, OF NEW YORK, N. Y.

MUSIC NOTATION FOR THE BLIND.

1,320,746.     Specification of Letters Patent.     Patented Nov. 4, 1919.

Application filed June 16, 1919. Serial No. 304,558.

*To all whom it may concern:*

Be it known that I, CARL A. EGENER, a citizen of the United States, residing at New York city, in the county and State of New York, have invented certain new and useful Improvements in Music Notations for the Blind, of which the following is a specification.

The object of the present invention is to provide an apparatus for the purpose of permitting blind persons to read music by touch, and which will further permit them to arrange a musical score in any desired way, so that a blind person can set up a musical score of any character, and can thus copy music or produce a new score or arrangement.

In the accompanying drawing showing one embodiment of my invention Figure 1 shows a score of two lines of music.

I provide on a suitable base one or a series of sets of bars, that extend up from the base, so that a person can learn by merely touching them that there are five lines. I also provide notes, and other musical characters that can be removably applied to these lines, and which appear in relief, so that a blind person by merely touching the note can tell at once on which of the five lines it is located, or between any of the same.

I further provide notes with ledger lines to be applied above or below these five bars.

Figure 1:
Figure 2:
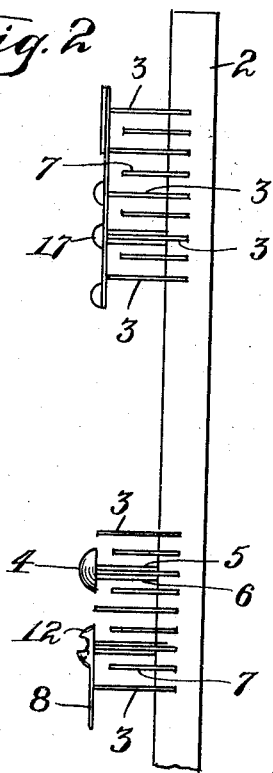
Fig. 2 is a side elevation.

In the arrangement shown, on a suitable base 2, I arrange five narrow strips, indicated by 3, that extend up from the base and are arranged parallel, and of equal height. I also provide notes that can be removably attached to these bars, or narrow plates that comprise a head 4, and spring arms 5 and 6 that project downwardly from the head, whereby these arms can straddle the plates 3, as indicated in Fig. 2, and thereby retain the note with the head arranged on one of the bars. Obviously the note can be placed at any desired position along the projecting strip and can be removed and replaced as often as desired.

Where the note is to be located between two of the regular five lines of the score, I preferably provide intermediate bars, such as narrow plates 7, that project upward between the plates 3, but preferably are of less height. The heads of the notes are preferably of sufficient width, in case there is no stem as in a whole note, to rest on the higher plates 3.

Figure 5:
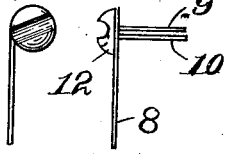
Fig. 5 represents a half note.

It will be understood that musical characters of every kind employed, are formed in relief, and provided with attaching means, such as the spring arms 5 and 6. In Fig. 5 a half note is shown with the usual stem 8, and spring arms 9 and 10. The head 12 has a groove to indicate the open portion of the note.

Figure 6:
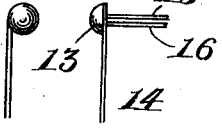
Fig. 6 represents a quarter note.
Figure 8:
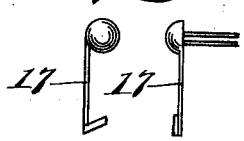
Fig. 8 represents an eighth note.

In Fig. 6 a quarter note is shown with a solid head 13, a stem 14, and spring arms 15 and 16. In Fig. 8, a similar construction is shown, for an eighth note denoted generally by 17.

Figure 9:
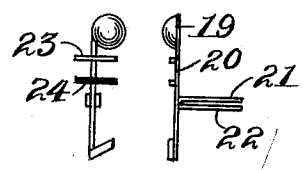
Fig. 9 represents a note on the ledger lines.

In Fig. 9 an eighth note is shown, in the form of a head 19, a stem 20, spring arms 21 and 22, and cross bars 23 and 24, to indicate two ledger lines. The spring arms are here placed on the stem below the head to be applied to either the top or the bottom plate 3.

Figure 3:
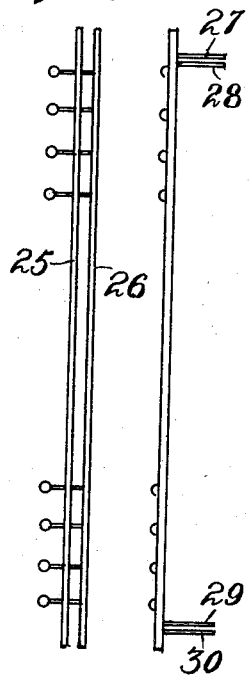
Fig. 3 shows in plan and elevation a notation for a double bar with rests.
Figure 4:
Fig. 4 represents a whole note without a stem.

In Fig. 3 a double cross bar is shown comprising strips 25 and 26, having spring arms 27, 28, at one end, and 29 and 30 at the other end. This arrangement extends across two sets of score lines and dots are provided in relief, to indicate a repeat.

Figure 7:
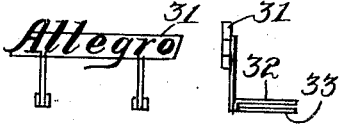
Fig. 7 represents a word to indicate the time.

In Fig. 7 I show a word arranged in relief on plate 31, with spring arms 32 and 33, to be attached where desired.

It is to be understood that any and all of the musical notation characters that may exist, can be formed in relief, and provided with suitable attaching means such as the spring arms set forth.

What I claim is:—

1. The combination of a base, a series of five bars carried by the base that are parallel and spaced a short distance apart to represent the five lines of a musical staff, and similar spaced bars on the base located one between each pair of said bars with their upper edges below the upper edges of said other bars, and a set of musical notations each representing a musical character such as notes, clefs, tempo and the like, each of said notations being provided with means to engage any of said bars whereby they may be removably attached on a bar, and which when attached serve to constitute a musical score supported in relief on the base adaptable for touch reading.

2. The combination of a base, a series of five bars carried by the base that are parallel and spaced a short distance apart to represent the five lines of a musical staff, and similar bars on the base located one between each pair of said strips with their upper edges below the upper edges of said bars, and a set of musical notations each representing a musical character such as notes, clefs, tempo, and the like, and provided with spring arms arranged to clamp on any of said bars, and constituting when attached a musical score supported in relief on the base adaptable for touch reading.

Signed at New York City, N. Y., on June 11th, 1919.

CARL A. EGENER.

Copies of this patent may be obtained for five cents each, by addressing the "Commissioner of Patents, Washington, D. C."